(12) United States Patent
Huang

(10) Patent No.: US 12,197,807 B2
(45) Date of Patent: Jan. 14, 2025

(54) AUDIO SIGNAL OUTPUTTING METHOD AND TERMINAL DEVICE

(71) Applicant: VIVO MOBILE COMMUNICATION CO., LTD., Guangdong (CN)

(72) Inventor: Kaiyu Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 307 days.

(21) Appl. No.: 17/477,888

(22) Filed: Sep. 17, 2021

(65) Prior Publication Data

US 2022/0004357 A1 Jan. 6, 2022

Related U.S. Application Data

(63) Continuation of application No. PCT/CN2020/076238, filed on Feb. 21, 2020.

(30) Foreign Application Priority Data

Mar. 18, 2019 (CN) .......................... 201910205202.2

(51) Int. Cl.
*G06F 3/16* (2006.01)
*H04M 1/72412* (2021.01)
*H04R 5/04* (2006.01)

(52) U.S. Cl.
CPC ........ *G06F 3/165* (2013.01); *H04M 1/72412* (2021.01); *H04R 5/04* (2013.01); *H04M 2250/02* (2013.01)

(58) Field of Classification Search
CPC ........ G06F 3/165; G06F 3/162; G06F 3/0482; G06F 3/167; G06F 3/16

(Continued)

(56) References Cited

U.S. PATENT DOCUMENTS 11,217,257 B2 * 1/2022 Li .......................... G10L 19/008
2008/0170703 A1 * 7/2008 Zivney .............. H04M 1/72448
381/2

(Continued)

FOREIGN PATENT DOCUMENTS

CN 106131753 A 11/2016
CN 108958695 A 12/2018

(Continued)

OTHER PUBLICATIONS

International Search Report of International Application No. PCT/CN2020/076238 mailed on Apr. 24, 2020.

(Continued)

*Primary Examiner* — Alexander Krzystan
(74) *Attorney, Agent, or Firm* — IP & T GROUP LLP

(57) ABSTRACT

An audio signal outputting method includes: in a case where a first audio signal is output through a first device, receiving a first input of a user that is used to trigger a terminal device to output a second audio signal; and in response to the first input, outputting the first audio signal through a second device, and outputting a second audio signal through a third device. The first audio signal and the second audio signal are audio signals generated by different applications in the terminal device. The first device is any one of the terminal device and the at least one audio device, and the second device and the third device are any two of the terminal device and the at least one audio device.

9 Claims, 5 Drawing Sheets

(58) Field of Classification Search
USPC .......................................................... 700/94
See application file for complete search history.

(56) References Cited

U.S. PATENT DOCUMENTS

| | | | | |
|---|---|---|---|---|
| 2012/0054664 | A1* | 3/2012 | Dougall | H04N 21/6582 |
| | | | | 715/772 |
| 2016/0267914 | A1* | 9/2016 | Hu | H04S 3/008 |
| 2017/0041694 | A1* | 2/2017 | Jaiswal | H04W 88/02 |
| 2017/0076735 | A1* | 3/2017 | Beack | G10L 19/167 |
| 2017/0286048 | A1* | 10/2017 | Yan | G06F 3/165 |
| 2017/0287496 | A1 | 10/2017 | Heitkamp et al. | |
| 2018/0335903 | A1* | 11/2018 | Coffman | G06F 3/04847 |
| 2019/0320219 | A1* | 10/2019 | Yoden | H04N 21/47217 |
| 2020/0225817 | A1* | 7/2020 | Coffman | G06F 3/0488 |
| 2020/0293270 | A1* | 9/2020 | Boeen | G06F 3/165 |
| 2020/0382569 | A1* | 12/2020 | Fornshell | H04L 65/611 |

FOREIGN PATENT DOCUMENTS

| | | |
|---|---|---|
| CN | 109067965 A | 12/2018 |
| CN | 109257500 A | 1/2019 |
| CN | 109408119 A | 3/2019 |
| CN | 109445740 A | 3/2019 |
| CN | 109445745 A | 3/2019 |
| CN | 110058836 A | 7/2019 |

OTHER PUBLICATIONS

Written Opinion of The International Searching Authority of International Application No. PCT/CN2020/075385 mailed on Apr. 24, 2020.
First Office Action of Priority Application No. CN201910205202.2 mailed on Apr. 2, 2020.
The Second Office Action of Priority Application No. CN201910205202.2 mailed on Jun. 5, 2020.
Notification to Grant Patent Right for Invention of Priority Application No. CN201910205202.2 mailed on Oct. 9, 2020.

* cited by examiner

AUDIO SIGNAL OUTPUTTING METHOD AND TERMINAL DEVICE

CROSS-REFERENCE TO RELATED APPLICATIONS

This application is a Bypass Continuation Application of PCT/CN2020/076238 filed on Feb. 21, 2020, which claims priority to Chinese Patent Application No. 201910205202.2 filed on Mar. 18, 2019, which are incorporated herein by reference in their entirety.

TECHNICAL FIELD

Embodiments of the present invention relate to the technical field of communication, and in particular, to an audio signal outputting method, and a terminal device.

BACKGROUND

With the popularization of terminal technology, terminal devices have more and more applications.

At present, there are two modes of outputting audio by the terminal device. The first mode is an audio focus grabbing mode, that is, in the process of outputting audio by a first application of the terminal device, if a user triggers the terminal device to output audio by a second application in the terminal device, the audio focus will be grabbed by the second application, and at this time, the first application will automatically pause outputting audio and the second application starts to output audio. The second mode is a sound mixing mode, that is, in the process of outputting audio by the first application, if a user triggers the terminal device to output audio by a second application, the first application and the second application may output audio at the same time.

In the process of outputting audio by the above two modes, the audio focus grabbing mode cannot support two applications in the terminal device to output audio at the same time, and the sound mixing mode cannot divide different audios; therefore, the current two audio output modes are not flexible enough, and the audio output experience is bad.

SUMMARY

According to a first aspect, an audio signal outputting method is provided and is applied to a terminal device. The terminal device is connected to at least one audio device. The method includes: receiving a first input of a user in a case of outputting a first audio signal through a first device, where the first input is used to trigger the terminal device to output a second audio signal, and the first audio signal and the second audio signal are respectively audio signals generated by different applications in the terminal device; and in response to the first input, outputting the first audio signal through a second device and outputting the second audio signal through a third device, where the first device is any one of the terminal device and the least one audio device, and the second device and the third device are any two of the terminal device and the at least one audio device.

According to a second aspect, a terminal device is provided. The terminal device is connected to at least one audio device. The terminal device includes: a receiving module and a control module, where the receiving module is configured to receive a first input of a user in a case of outputting a first audio signal through a first device; the first input is used to trigger the terminal device to output a second audio signal; the first audio signal and the second audio signal are respectively audio signals generated by different applications in the terminal device; the control module is configured to, in response to the first input received by the receiving module, output the first audio signal through a second device and output the second audio signal through a third device; and the first device is at least one device of the terminal device and the least one audio device, and the second device and the third device are any two of the terminal device and the at least one audio device.

According to a third aspect, a terminal device is provided. The terminal device includes a processor, a memory, and a computer program stored in the memory and executable on the processor, where when the computer program is executed by the processor, the steps of the audio signal outputting method according to the first aspect are implemented.

According to a fourth aspect, a non-transitory computer readable storage medium is provided. The non-transitory computer readable storage medium stores a computer program. When the computer program is executed by a processor, the steps of the audio signal outputting method according to the first aspect are implemented.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the specification and claims of the present disclosure, the terms "first", "second", and so on are intended to distinguish between different objects, but do not describe a particular order of the objects. For example, a first input and a second input are intended to distinguish between different inputs, instead of describing a particular order of the inputs.

It should be noted that in this embodiment of the present disclosure, the term such as "exemplary" or "for example" is used for representing an example, an illustration, or a description. Any embodiment or design scheme described as an "example" or "for example" in the embodiments of the present disclosure should not be explained as being more preferred or having more advantages than another embodiment or design scheme. To be precise, the use of the term such as "exemplary" or "for example" is intended to present a related concept in a specific manner.

The terminal device in the embodiments of the present disclosure may be a terminal device with an operating system. The operating system may be an Android operating system, or may be an iOS operating system, or may be another possible operating system, which is not specifically limited in this embodiment of the present disclosure.

Taking the Android operating system as an example, the following describes a software environment to which an audio signal outputting method provided in the embodiments of the present disclosure is applied.

Figure 1:
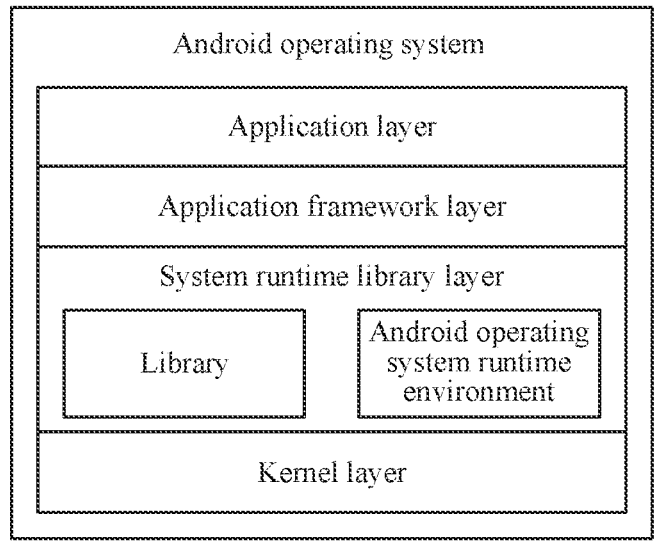
FIG. 1 is a schematic diagram of an architecture of a possible Android operating system according to an embodiment of the present disclosure.

As shown in FIG. 1, FIG. 1 is a schematic diagram of an architecture of a possible Android operating system according to an embodiment of the present disclosure. In FIG. 1, the architecture of the Android operating system includes 4 layers, namely: an application program layer, an application program framework layer, a system runtime library layer, and a kernel layer (specifically, it may be the Linux kernel layer).

The application layer includes various applications in the Android operating system (including system applications and third-party applications).

The application program framework layer is an application program framework, and the developer may develop some applications based on the application program framework layer when following a development rule of the application program framework.

The system runtime library layer includes a library (also referred to as a system library) and a running environment of the Android operating system. The library mainly provides various resources required for the Android operating system. The running environment of the Android operating system is used to provide a software environment for the Android operating system.

The kernel layer is an operating system layer of the Android operating system, which belongs to the bottom layer of software levels of the Android operating system. The kernel layer provides core system services and hardware-related driver programs for the Android operating system based on the Linux kernel.

The Android operating system is used as an example. In this embodiment of the present disclosure, based on the system architecture of the Android operating system shown in FIG. 1, developers can develop a software program that implements the audio signal outputting method provided in the embodiments of the present disclosure, so that the audio signal outputting method may be performed based on the Android operating system shown in FIG. 1. That is, a processor or the terminal device may run the software program in the Android operating system to implement the audio signal outputting method provided in this embodiment of the present disclosure.

In the audio signal outputting method provided in the embodiments of the present disclosure, the terminal device is connected to at least one audio device. The terminal device receives a first input of a user in a case of outputting a first audio signal through a first device, where the first input is used to trigger the terminal device to output a second audio signal, and the first audio signal and the second audio signal are respectively audio signals generated by different applications in the terminal device; and the terminal device, in response to the first input, outputs the first audio signal through a second device and outputs the second audio signal through a third device, where the first device is any one of the terminal device and the at least one audio device, and the second device and the third device are any two of the terminal device and the at least one audio device. By the solution, in a case of outputting the first audio signal through the first device, the terminal device may be triggered by the first input to output the first audio signal through the second device and output the second audio signal through the third device. Therefore, in the audio signal outputting method provided by the embodiments of the present disclosure, the terminal device may output two different audio signals through two different devices at the same time so as to control the output of the audio signal more flexibly and improve the audio output experience.

The terminal device in the embodiments of the present disclosure may be a mobile terminal device or a non-mobile terminal device. The mobile terminal device may be a mobile phone, a tablet computer, a notebook computer, a palmtop computer, a vehicle-mounted terminal device, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This is not specifically limited in the embodiment of the present disclosure.

An executive subject of the audio signal outputting method provided by the embodiments of the present disclosure may be the terminal device (including a mobile terminal device and a non-mobile the terminal device), or may be a functional module and/or functional entity in the terminal device that can implement the audio signal outputting method. This may be specifically determined according to actual usage requirements, and is not limited in the embodiments of the present disclosure. Taking the terminal device as an example, the following exemplarily describes the audio signal outputting method provided in the embodiments of the present disclosure.

Figure 2:
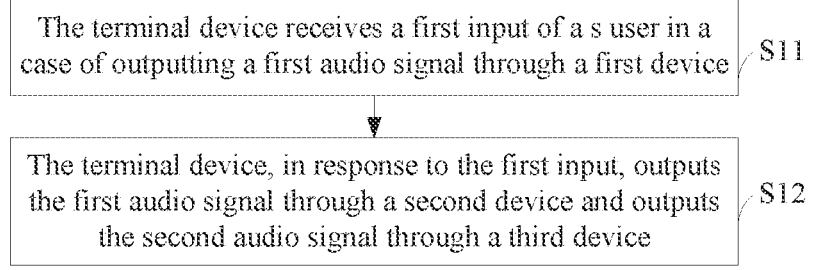
FIG. 2 is a first flowchart of an audio signal outputting method according to an embodiment of the present disclosure.

As shown in FIG. 2, the audio signal outputting method provided by the embodiments of the present disclosure includes the following S11 and S12.

S11: The terminal device receives a first input of a user in a case of outputting a first audio signal through a first device, where the first input is used to trigger the terminal device to output the second audio signal, and the first audio signal and the second audio signal are respectively audio signals generated by different applications in the terminal device.

Optionally, outputting an audio signal in the embodiments of the present disclosure may refer to playing the audio signal, for example, outputting the first audio signal through the first device may refer to playing the first audio signal through the first device.

In the embodiments of the present disclosure, the terminal device is connected to at least one audio device.

Optionally, the audio device in the embodiment of the present disclosure refers to a device with an audio play function.

S12: The terminal device, in response to the first input, outputs the first audio signal through a second device and outputs the second audio signal through a third device, where the first device is at least one device of the terminal device and the at least one audio device, and the second device and the third device are any two of the terminal device and the at least one audio device.

Optionally, assuming that the terminal device is connected to a Bluetooth headset and a Bluetooth speaker, the first device may be any one of the terminal device, the Bluetooth headset and the Bluetooth speaker, and the second device and the third device may be any two of the terminal device, the Bluetooth headset and the Bluetooth speaker.

Optionally, the second device and the first device may be the same device, that is, the second device may be the first device.

Optionally, the third device and the first device may be the same device, that is, the third device may be the first device.

Optionally, the terminal device and the at least one audio device may be connected through Bluetooth.

Optionally, the embodiments of the present disclosure, the audio device may include a Bluetooth speaker.

Optionally, the Bluetooth speaker may be a vehicle-mounted speaker.

According to the audio signal outputting method provided by the embodiments of the present disclosure, the terminal device receives the first input of the user in a case of outputting the first audio signal through the first device, where the first input is used to trigger the terminal device to output a second audio signal, and the first audio signal and the second audio signal are respectively audio signals generated by different applications in the terminal device, and the terminal device, in response to the first input, outputs the first audio signal through the second device and outputs the second audio signal through the third device, where the first device is any one of the terminal device and the at least one audio device, and the second device and the third device are any two of the terminal device and the at least one audio device. By the solution, in a case of outputting the first audio signal through the first device, the terminal device may be triggered by the first input to output the first audio signal through the second device and output the second audio signal through the third device. Therefore, in the audio signal outputting method provided by the embodiments of the present disclosure, the terminal device may output two different audio signals through two different devices at the same time so as to control the output of the audio signal more flexibly and improve the audio output experience.

Optionally, the third device and the first device may the same device, that is, the third device may be the first device. In the embodiments of the present disclosure, the step that the terminal device outputs the first audio signal through the second device and outputs the second audio signal through the third device includes: the terminal device controls the first device to stop outputting the first audio signal, outputs the second audio signal through the first device, and outputs the first audio signal through the third device.

Figure 3:
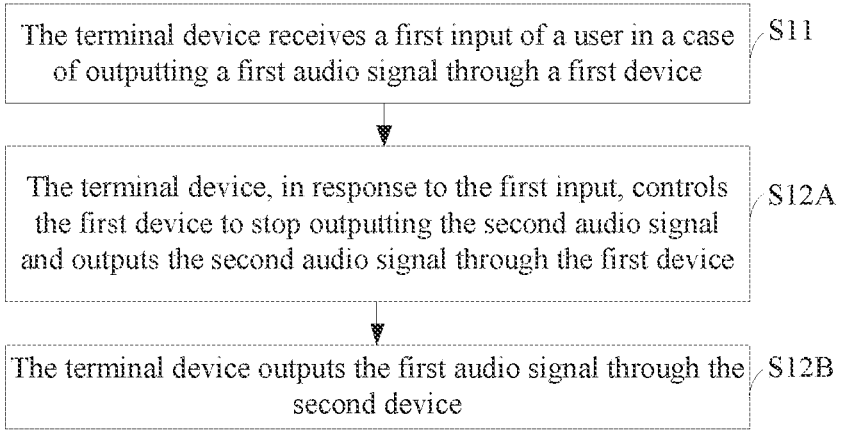
FIG. 3 is a second flowchart of an audio signal outputting method according to an embodiment of the present disclosure.

Exemplarily, with reference FIG. 2 and as shown in FIG. 3, the following S12A and S12B may be replaced with the above S12.

S12A: The terminal, in response to the first input, controls the first device to stop outputting the first audio signal and outputs the second audio signal through the first device.

S12B: The terminal device outputs the first audio signal through the second device.

Optionally, in the embodiments of the present disclosure, after controlling the first device to stop outputting the first audio signal, the terminal device may output the second audio signal through the first device and output the first audio signal through the second device.

Exemplarily, assuming that the terminal device is connected to a Bluetooth headset and a Bluetooth speaker, in a case that a loudspeaker of the terminal device outputs a first audio signal, an audio focus is occupied by the first audio signal, and in response to the first input, the audio focus is occupied by the second audio signal. At this time, the loudspeaker of the terminal device may stop outputting the first audio signal and start to output the second audio signal. Moreover, the terminal device may control the Bluetooth headset or the Bluetooth speaker to output the first audio signal.

Optionally, the terminal device may display two audio output controls, wherein one of the audio output controls is configured to control the output of the first audio signal, and the second audio control is configured to control the output of the second audio signal.

Optionally, in the embodiments of the present disclosure, after outputting the first audio signal through the second device and outputting the second audio signal through the third device, the terminal device may also display a first output control and a second output control, where the first output control is configured to control the output of the first audio signal, and the second output control is configured to control the output audio signal.

Optionally, in the embodiments of the present disclosure, the terminal device may display a plurality of audio output controls after turning on a multi-audio output control display function, and may only display one audio output control after turning off the multi-audio output control display function, where the one audio output control may be a default audio output control.

Figure 4:
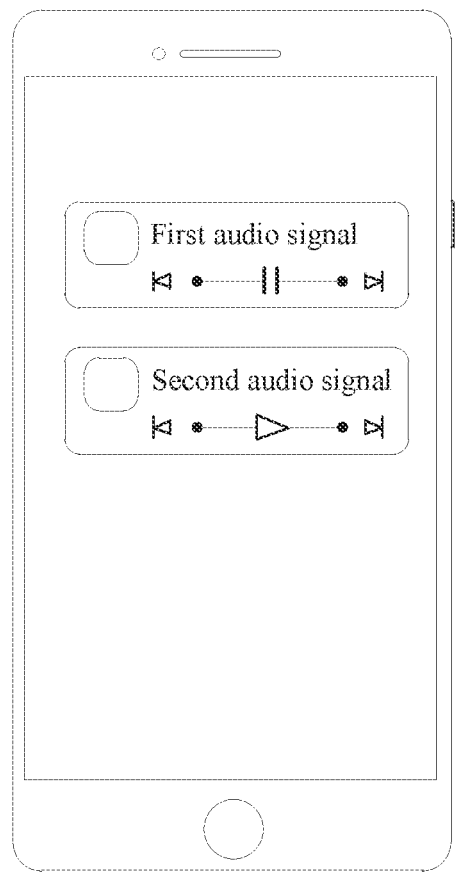
FIG. 4 is a first schematic diagram of an interface displayed by a terminal device according to an embodiment of the present disclosure.

Exemplarily, after the terminal device receives the above first input, an interface of the terminal device may display two audio output controls shown in FIG. 4, where a control 01 of the two audio output controls is configured to control the output of the first audio signal; a control 02 is configured to control the output of the second audio signal; and in response to the first input, it may be seen that the second audio signal controlled by the control 02 is in a state of stopping output, and the first audio signal output by the control 01 is in a state of being output.

Figure 5:
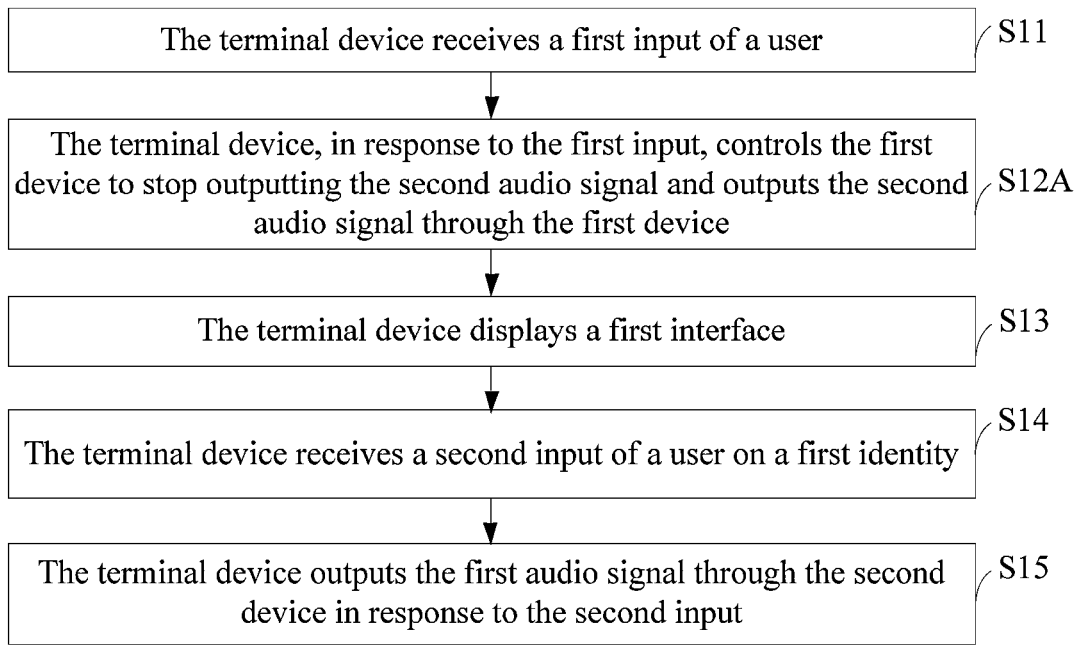
FIG. 5 is a third flowchart of an audio signal outputting method according to an embodiment of the present disclosure.

Exemplarily, with reference to FIG. 3 and as shown in FIG. 5, after the S12A and before the S12B, the audio signal outputting method provided by the embodiments of the present disclosure further includes the following S13 and S14.

S13: The terminal device displays a first interface.

The first interface may include at least two identities, and each of the at least two identities is used to indicate one device.

Optionally, the identities may be names or icons of the audio device.

S14: The terminal device receives a second input of a user on a first identity.

The first identity is one of the at least two identities and is used to indicate a second device.

Figure 6:
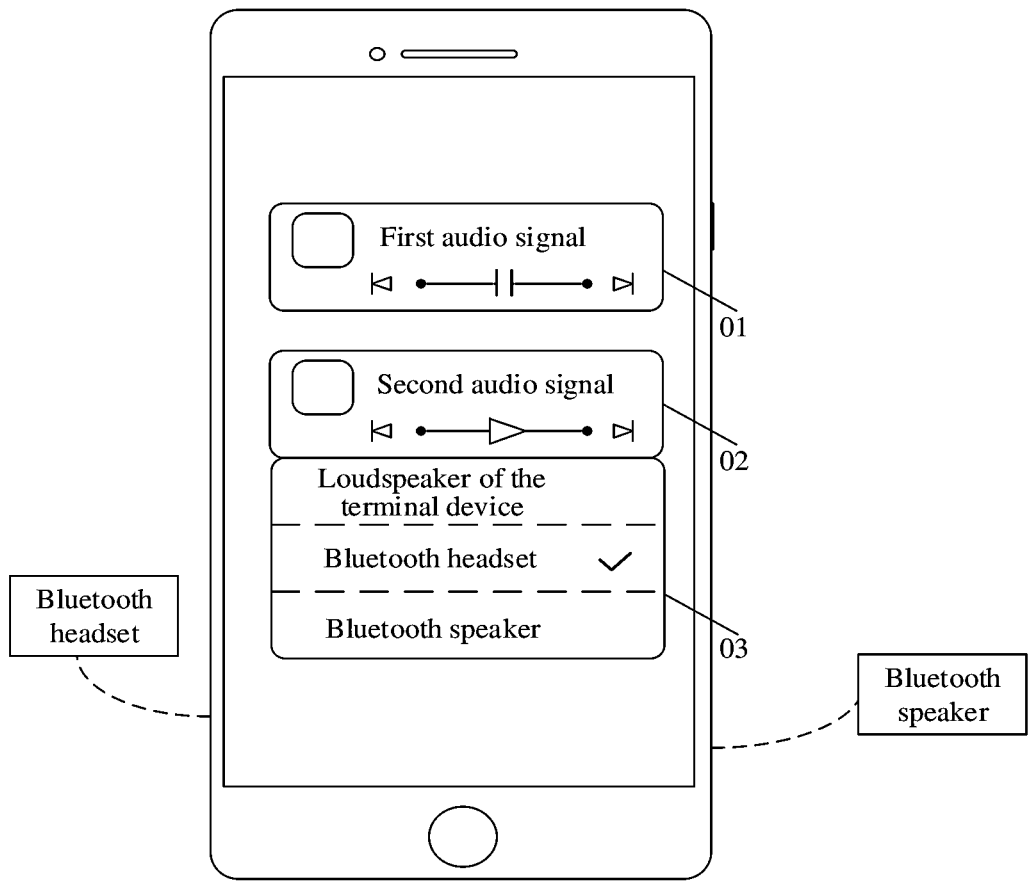
FIG. 6 is a second schematic diagram of an interface displayed by a terminal device according to an embodiment of the present disclosure.

Optionally, as shown in FIG. 6, the terminal device may display a first interface 03 shown in FIG. 6, the first interface 03 displays identities of three devices, namely a loudspeaker of the terminal device, a Bluetooth headset and a Bluetooth speaker. A user may tick the identity of a certain device to select the device to output the second audio signal. The ticked device is the third device. FIG. 6 performs description by taking the case where the Bluetooth head set is the third device as an example.

As shown in FIG. 5, the following S15 may be replaced with the above S12B.

S15: The terminal device outputs the first audio signal through the second device in response to a second input.

Optionally, the second device and the first device may the same device, that is, the second device may be the first device. Before the second audio signal is output through the third device, the audio signal outputting method provided by the embodiments of the present disclosure may further include: the terminal device display a first interface, where the first interface includes at least two identities, and each of the at least two identities is used to indicate one device, and the terminal device receives a third input of a user on a second identity, where the second identity is one of the at least two identities and is used to indicate the third device.

Optionally, outputting the first audio signal through the third device includes: in response to the third input, outputting the second audio signal through the third device.

Optionally, after the above S12 in the embodiments of the present disclosure, the terminal device may also display a first interface, where the first interface includes at least two identities, and each of the at least two identities is used to indicate one device; the terminal device receives a fourth input on a third identity, where the third identity is one of the at least two identities and is used to indicate a fourth device; and the terminal device outputs a target audio signal through the fourth device in response to the fourth input, where the target audio signal is the first audio signal or the second audio signal.

In the embodiments of the present disclosure, after the above S12, the terminal device may be triggered by an input of a user on the third identity to control the fourth device to output the first audio signal or the second audio signal. Therefore, in the embodiment of the present disclosure, the user may manually switch the device to output the audio signal after S12, and the audio signal outputting method is more flexible.

Optionally, in a case that a mode of outputting audio in a system of the terminal is a mode of grabbing an audio focus, the audio output mode in the above method embodiment may be adopted (for example, the modes shown in FIG. 3 and FIG. 5).

Optionally, in a case that a mode of outputting audio in the system of the terminal device is a sound mixing mode, the terminal device, in response to a second input, may still adopt the first device to continuously output a second audio signal and display an interface similar to the first interface 03 in FIG. 6 so as to be convenient for the user to select other devices to output the first audio signal. The other devices may be any one, except for the first device, of the terminal device and the at least one audio device.

It may be understood that in a case that the audio output mode in the system of the terminal device is a sound mixing mode, the terminal device, in response to the second input, may also select two different devices from the terminal device and the at least one audio device to output the first audio signal and the second audio signal respectively.

It should be noted that in the embodiments of the present disclosure, the audio signal outputting method shown in each of the foregoing accompanying drawings is described by using an accompanying drawing in the embodiments of the present disclosure as an example. During specific implementation, the audio signal outputting method shown in each of the foregoing accompanying drawings may be implemented in combination with other accompanying drawings illustrated in the foregoing embodiments, and details are not described herein again.

Figure 7:
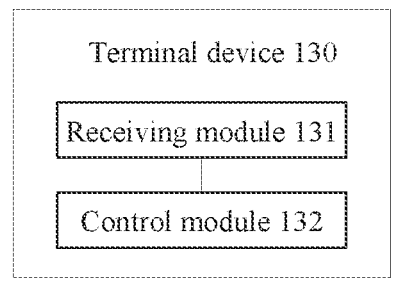
FIG. 7 is a first structural schematic diagram of a terminal device according to an embodiment of the present disclosure.

As shown in FIG. 7, the embodiments of the present disclosure provide a terminal device 130. The terminal device 130 is connected to at least one audio equipment. The terminal device 130 includes: a receiving module 131 and a control module 132.

The receiving module 131 is configured to receive a first input of a user in a case of outputting a first audio signal through a first device, where the first input is used to trigger the terminal device to output a second audio signal: and the first audio signal and the second audio signal are respectively audio signals generated by different applications in the terminal device. The control module 132 is configured to, in response to the first input received by the receiving module 131, output the first audio signal through a second device and output the second audio signal through a third device, where the first device is at least one device of the terminal device and the least one audio device, and the second device and the third device are any two of the terminal device and the at least one audio device.

Optionally, the second device and the first device are the same device; or the third device and the first device are the same device.

Optionally, the third device and the first device are the same device. The control module 132 is configured to control the first device to stop outputting the second audio signal, output the second audio signal through the first device and output the first audio signal through the third device.

Figure 8:
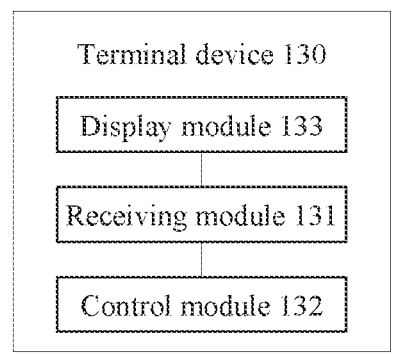
FIG. 8 is a second structural schematic diagram of a terminal device according to an embodiment of the present disclosure.

Optionally, with reference to FIG. 7 and as shown in FIG. 8, the terminal device 131 further includes a display module 133. The display module 133 is configured to display a first interface after the second audio signal is output through the first device and the first audio signal is output through the second device, where the first interface includes at least two identities, and each of the at least two identities is used to indicate one device. The receiving module 131 is further configured to receive a second input of a user on a first identity, where the first identity is one of the at least two identities and is used to indicate the second device. The control module 132 is configured to output the first audio signal through the second device in response to the second input received by the receiving module 131.

Optionally, the second device and the first device are the same device. As shown in FIG. 8, the terminal device further includes a display module 133. The display module 133 is configured to display a first interface before the control module 132 outputs the second audio signal through the third device, where the first interface includes at least two identities, and each of the at least two identities is used to indicate one device. The receiving module 131 is further configured to receive a third input of a user on a second identity, where the second identity is one of the at least two identities and is used to indicate the third device. The control module 132 is configured to output the second audio signal through the third device in response to the third input received by the receiving module 131.

Optionally, as shown in FIG. 8, the terminal device further includes a display module 133. The display module 133 is further configured to display a first output control and a second output control after the control module 132 outputs the first audio signal through the second device and outputs the second audio signal through the third device, where the first output control is configured to control the output of the first audio signal and the second output control is used to control the output of the second audio signal.

Optionally, as shown in FIG. 8, the terminal device further includes a display module 133. The display module 133 is further configured to display a first interface after the control module 132 outputs the first audio signal through the second device and outputs the second audio signal through the third device, where the first interface includes at least two identities, and each of the at least two identities is used to indicate one device. The receiving module 131 is further configured to receive a fourth input of a user on a third identity, where the third identity is one of the at least two identities and is used to indicate a fourth device. The control module 132 is further configured to output a target audio signal through the fourth device in response to the fourth input received by the receiving module 131, where the target audio signal is the first audio signal or the second audio signal.

The terminal device provided in this embodiment of the present invention can implement various processes in the foregoing method embodiment. To avoid repetition, details are not described herein again.

The embodiments of the present disclosure provide a terminal device. The terminal device receives a first input of a user in a case of outputting a first audio signal through a first device, where the first input is used to trigger the terminal device to output a second audio signal, and the first audio signal and the second audio signal are respectively audio signals generated by different applications in the terminal device; and the terminal device, in response to the first input, outputs the first audio signal through a second device and outputs the second audio signal through a third device, where the first device is any one of the terminal device and the at least one audio device, and the second device and the third device are any two of the terminal device and the at least one audio device. By the solution, in a case of outputting the first audio signal through the first device, the terminal device may be triggered by the first input to output the first audio signal through the second device and output the second audio signal through the third device. Therefore, in the audio signal outputting method provided by the embodiments of the present disclosure, the terminal device may output two different audio signals through two different devices at the same time so as to control the output of the audio signal more flexibly and improve the audio output experience.

Figure 9:
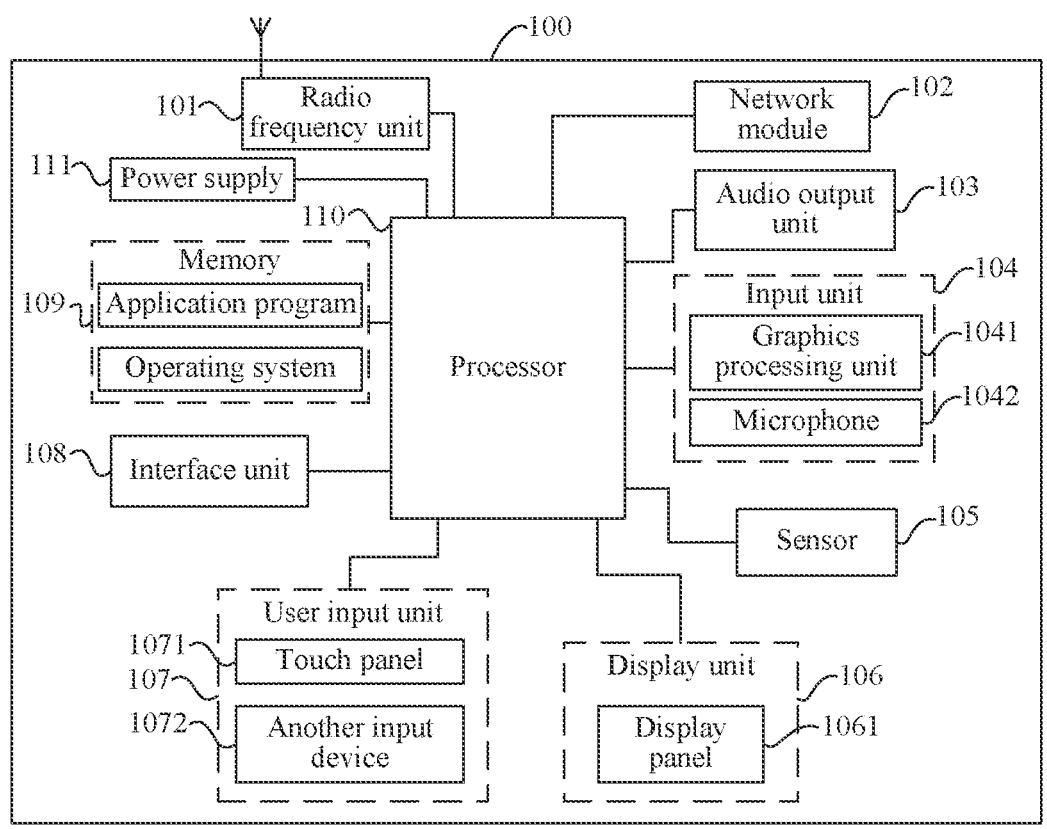
FIG. 9 is a hardware schematic diagram of a terminal device according to an embodiment of the present disclosure.

FIG. 9 is a hardware schematic diagram of a terminal device according to an embodiment of the present disclosure. The terminal device 100 includes, but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. It can be understood by a person skilled in the art that, the terminal device structure shown in FIG. 9 does not constitute a limitation on the terminal device, and the terminal device may include more or fewer components than those shown in the figure, or combine some components, or have different component arrangements. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The terminal device is connected to at least one audio device. A user input unit 107 is used for the terminal device to receive a first input of a user in a case of outputting a first audio signal through a first device, where the first input is used to trigger the terminal device to output a second audio signal, and the first audio signal and the second audio signal are respectively audio signals generated by different applications in the terminal device. A processor 110 is configured to, in response to the first input, outputs the first audio signal through a second device and outputs the second audio signal through a third device, where the first device is any one of the terminal device and the at least one audio device, and the second device and the third device are any two of the terminal device and the at least one audio device.

The embodiments of the present disclosure provide a terminal device. The terminal device receives a first input of a user in a case of outputting a first audio signal through a first device, where the first input is used to trigger the terminal device to output a second audio signal, and the first audio signal and the second audio signal are respectively audio signals generated by different applications in the terminal device; and the terminal device, in response to the first input, outputs the first audio signal through a second device and outputs the second audio signal through a third device, where the first device is any one of the terminal device and the at least one audio device, and the second device and the third device are any two of the terminal device and the at least one audio device. By the solution, in a case of outputting the first audio signal through the first device, the terminal device may be triggered by the first input to output the first audio signal through the second device and output the second audio signal through the third device. Therefore, in the audio signal outputting method provided by the embodiments of the present disclosure, the terminal device may output two different audio signals through two different devices at the same time so as to control the output of the audio signal more flexibly and improve the audio output experience.

It should be understood that, in this embodiment of the present disclosure, the radio frequency unit 101 may be configured to receive and transmit information or a signal in a call process. For example, after receiving downlink data from a base station, the radio frequency unit 101 transmits the downlink data to the processor 110 for processing. In addition, the radio frequency unit 101 transmits uplink data to the base station. Generally, the radio frequency unit 101 includes, but is not limited to, an antenna, at least one amplifier, a transceiver, a coupler, a low noise amplifier, and a duplexer, and the like. In addition, the radio frequency unit 101 may further communicate with a network and other devices through a wireless communications system.

The terminal device provides wireless broadband Internet access for the user by using the network module 102, for example, helping the user to send and receive an e-mail, browse a web page, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. The image frame processed by the graphics processor 1041 may be stored in the memory 109 (or another storage medium) or transmitted by using the radio frequency unit 101 or the network module 102. The microphone 1042 may receive sound and may process such sound into audio data. The processed audio data may be converted, in a call mode, into a format that may be transmitted to a mobile communication base station by using the radio frequency unit 101 for output.

The terminal device 100 further includes at least one sensor 105, such as a light sensor, a motion sensor, and other sensors. For example, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration in each direction (generally, three axes), and detect a value and a direction of gravity when the accelerometer sensor is static, and may be configured to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information input by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input digit or character information, and generate key signal input related to user setting and function control of the terminal device. For example, the user input unit 107 includes a touch panel 1071 and another input device 1072. The touch panel 1071, also called a touch screen, may collect touch operation on or near the touch panel by users (for example, operation on the touch panel 1071 or near the touch panel 1071 by fingers or any suitable objects or accessories such as a touch pen by the users). The touch panel 1071 may include two parts: a touch detection device and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 110, and receives and executes a command sent by the processor 110. In addition, the touch panel 1071 may be implemented by using a plurality of types such as a resistive type, a capacitive type, an infrared ray type, and a surface acoustic wave type. The user input unit 107 may further include other input devices 1072 in addition to the touch panel 1071. For example, the another input device 1072 may include, but is not limited to, a physical keyboard, a function key (for example, a volume control key or a switch key), a trackball, a mouse, and a joystick. Details are not described herein again.

Optionally, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 9, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application program required for at least one function (for example, a sound output function or an image output function), and the like. The data storage area may store data (for example, audio data or an address book) or the like created based on use of the mobile phone. In addition, the memory 109 may include a high-speed random-access memory, and may further include a nonvolatile memory, for example, at least one disk storage device, a flash memory, or other volatile solid-state storage devices.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may be integrated with an application processor and a modem processor. The application processor mainly processes an operating system, a user interface, an application program, and the like, and the modem processor mainly processes wireless communication. It may be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system. In addition, the terminal device 100 includes some function modules not shown, and details are not described herein.

The embodiments of the present disclosure further provide a terminal device. The terminal device may include a processor, a memory, and a computer program stored in the memory and executable on the processor. When the computer program is executed by the processor, various processes performed by the terminal device in the above method embodiment may be implemented, and a same technical effect can be achieved. To avoid repetition, details are not described herein again.

The embodiments of the present disclosure further provide a non-transitory computer readable storage medium. The non-transitory computer readable storage medium stores a computer program. When the computer program is executed by the processor, various processes performed by the terminal device in the above method embodiment may be implemented, and a same technical effect can be achieved. To avoid repetition, details are not described herein again. The non-transitory computer readable storage medium may be a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more restrictions, an element defined by the statement "including a . . . " does not exclude another same element in a process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An audio signal outputting method, applied to a terminal device which is connected to and controls a Bluetooth headset or a Bluetooth speaker through Bluetooth, and the method comprises:
   receiving a first input of a user in a case of outputting a first audio signal through a loudspeaker of the terminal device, wherein the first input is used to trigger the terminal device to output a second audio signal, and the first audio signal and the second audio signal are audio signals generated by different applications in the terminal device; and
   in response to the first input, controlling the loudspeaker of the terminal device to stop outputting the first audio signal, outputting a third audio signal through the Bluetooth headset or the Bluetooth speaker and outputting the second audio signal through the loudspeaker of the terminal device, wherein the first audio signal and the third audio signal are audio signals generated at different times by a same application in the terminal device; wherein
   after the outputting the second audio signal through the loudspeaker of the terminal device and before the outputting a third audio signal through the Bluetooth headset or the Bluetooth speaker, the method further comprises:
   displaying a first interface, the first interface comprising at least two identities, and each of the at least two identities being used to indicate one device, wherein a positioning of the first interface in a user interface is below a positioning of audio output controls; and
   receiving a second input of a user on the first identity, the first identity being one of the at least two identities and being used to indicate the Bluetooth headset or the Bluetooth speaker; and
   the outputting a third audio signal through the Bluetooth headset or the Bluetooth speaker comprises:
   in response to the second input, outputting the third audio signal through the Bluetooth headset or the Bluetooth speaker.

2. The method according to claim 1, wherein after the outputting a third audio signal through the Bluetooth headset or the Bluetooth speaker and outputting the second audio signal through the loudspeaker of the terminal device, the method further comprises:
   displaying a first output control and a second output control, the first output control being configured to control the output of the third audio signal, and the second output control being configured to control the output of the second audio signal; wherein the audio output controls comprises the first output control and the second output control.

3. The method according to claim 1, wherein after the outputting a third audio signal through the Bluetooth headset or the Bluetooth speaker and outputting the second audio signal through the loudspeaker of the terminal device, the method further comprises:
   displaying a first interface, the first interface comprising at least two identities, and each of the at least two identities being used to indicate one device;
   receiving a fourth input of a user on a third identity, the third identity being one of the at least two identities and being used to indicate a fourth device; and
   in response to the fourth input, outputting a target audio signal through the fourth device, the target audio signal being a fourth audio signal or a fifth audio signal; wherein the fourth device is any one of the terminal device, the Bluetooth headset or the Bluetooth speaker, wherein the fourth audio signal and the third audio signal are audio signals generated at different times by the same application in the terminal device, and the fifth audio signal and the second audio signal are audio signals generated at different times by a same application in the terminal device.

4. A terminal device, being connected to and controlling a Bluetooth headset or a Bluetooth speaker through Bluetooth, and comprising a processor, a memory, and a computer program stored in the memory and executable on the processor, wherein the computer program, when executed by the processor, causes the terminal device to perform:
   receiving a first input of a user in a case of outputting a first audio signal through a loudspeaker of the terminal device, wherein the first input is used to trigger the terminal device to output a second audio signal, and the first audio signal and the second audio signal are audio signals generated by different applications in the terminal device; and in response to the first input, controlling the loudspeaker of the terminal device to stop outputting the first audio signal, outputting a third audio signal through the Bluetooth headset or the Bluetooth speaker and outputting the second audio signal through the loudspeaker of the terminal device, wherein the first audio signal and the third audio signal are audio signals generated at different times by a same application in the terminal device; wherein the computer program, when executed by the processor, causes the terminal device to further perform:

displaying a first interface, the first interface comprising at least two identities, and each of the at least two identities being used to indicate one device, wherein a positioning of the first interface in a user interface is below a positioning of audio output controls; and receiving a second input of a user on the first identity, the first identity being one of the at least two identities and being used to indicate the Bluetooth headset or the Bluetooth speaker;

the computer program, when executed by the processor, causes the terminal device to perform:

in response to the second input, outputting the third audio signal through the Bluetooth headset or the Bluetooth speaker.

5. The terminal device according to claim 4, wherein the computer program, when executed by the processor, causes the terminal device to further perform:

displaying a first output control and a second output control, the first output control being configured to control the output of the third audio signal, and the second output control being configured to control the output of the second audio signal; wherein the audio output controls comprises the first output control and the second output control.

6. The terminal device according to claim 4, wherein the computer program, when executed by the processor, causes the terminal device to further perform:

displaying a first interface, the first interface comprising at least two identities, and each of the at least two identities being used to indicate one device;

receiving a fourth input of a user on a third identity, the third identity being one of the at least two identities and being used to indicate a fourth device; and in response to the fourth input, outputting a target audio signal through the fourth device, the target audio signal being a fourth audio signal or a fifth audio signal; wherein the fourth device is any one of the terminal device, the Bluetooth headset or the Bluetooth speaker, wherein the fourth audio signal and the third audio signal are audio signals generated at different times by the same application in the terminal device, and the fifth audio signal and the second audio signal are audio signals generated at different times by a same application in the terminal device.

7. A non-transitory computer readable storage medium, storing a computer program, wherein the computer program, when executed by a processor of a terminal device, causes the terminal device to perform:

receiving a first input of a user in a case of outputting a first audio signal through a loudspeaker of the terminal device, wherein the first input is used to trigger the terminal device to output a second audio signal, and the first audio signal and the second audio signal are audio signals generated by different applications in the terminal device; and in response to the first input, controlling the loudspeaker of the terminal device to stop outputting the first audio signal, outputting a third audio signal through a Bluetooth headset or a Bluetooth speaker and outputting the second audio signal through the loudspeaker of the terminal device, wherein the first audio signal and the third audio signal are audio signals generated at different times by a same application in the terminal device; wherein the terminal device is connected to and controls the Bluetooth headset or the Bluetooth speaker through Bluetooth; wherein the computer program, when executed by the processor, causes the terminal device to further perform:

displaying a first interface, the first interface comprising at least two identities, and each of the at least two identities being used to indicate one device, wherein a positioning of the first interface in a user interface is below a positioning of audio output controls; and receiving a second input of a user on the first identity, the first identity being one of the at least two identities and being used to indicate the Bluetooth headset or the Bluetooth speaker;

the computer program, when executed by the processor, causes the terminal device to perform:

in response to the second input, outputting the third audio signal through the Bluetooth headset or the Bluetooth speaker.

8. The non-transitory computer readable storage medium according to claim 7, wherein the computer program, when executed by the processor, causes the terminal device to further perform:

displaying a first output control and a second output control, the first output control being configured to control the output of the third audio signal, and the second output control being configured to control the output of the second audio signal; wherein the audio output controls comprises the first output control and the second output control.

9. The non-transitory computer readable storage medium according to claim 7, wherein the computer program, when executed by the processor, causes the terminal device to further perform:

displaying a first interface, the first interface comprising at least two identities, and each of the at least two identities being used to indicate one device;

receiving a fourth input of a user on a third identity, the third identity being one of the at least two identities and being used to indicate a fourth device; and in response to the fourth input, outputting a target audio signal through the fourth device, the target audio signal being a fourth audio signal or a fifth audio signal; wherein the fourth device is any one of the terminal device, the Bluetooth headset or the Bluetooth speaker, wherein the fourth audio signal and the third audio signal are audio signals generated at different times by the same application in the terminal device, and the fifth audio signal and the second audio signal are audio signals generated at different times by a same application in the terminal device.

* * * * *